(12) United States Patent
Baker

(10) Patent No.: US 9,479,058 B2
(45) Date of Patent: Oct. 25, 2016

(54) POWER SUPPLY REGULATOR

(71) Applicant: Broadcom Corporation, Irvine, CA (US)

(72) Inventor: Michael Owen Baker, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 315 days.

(21) Appl. No.: 13/937,991

(22) Filed: Jul. 9, 2013

(65) Prior Publication Data

US 2015/0002119 A1    Jan. 1, 2015

Related U.S. Application Data

(60) Provisional application No. 61/841,000, filed on Jun. 28, 2013.

(51) Int. Cl.
*G05F 1/00*    (2006.01)
*H02M 3/158*   (2006.01)

(52) U.S. Cl.
CPC .......... *H02M 3/1588* (2013.01); *Y02B 70/1466* (2013.01)

(58) Field of Classification Search
CPC ............ G05F 3/24; G05F 1/575; G05F 1/56; G05F 1/573; G05F 3/262; G05F 3/30; G05F 3/20; G05F 1/465; H02M 2001/007; H02M 3/1588; H02M 3/156; H01L 27/0266; H01L 27/0251; H02H 3/023; H02H 3/207; H02H 3/202; H03K 17/0826; H03K 17/0822
USPC ........ 323/231, 265–266, 271, 273, 274–277, 323/278, 279–281, 282, 284, 303; 361/56, 361/57, 88, 90, 91.1, 91.5, 91.6; 327/538–543
See application file for complete search history.

(56) References Cited

U.S. PATENT DOCUMENTS

| | | | | |
|---|---|---|---|---|
| 3,697,861 A | * | 10/1972 | Frazier | ............... 323/277 |
| 8,755,161 B2 | * | 6/2014 | James | ........ H02H 3/207 361/91.1 |
| 2009/0033405 A1 | * | 2/2009 | Yanagishima | ...... H02M 1/08 327/427 |
| 2014/0146426 A1 | * | 5/2014 | Murakami | ............ 361/56 |

* cited by examiner

*Primary Examiner* — Nguyen Tran
(74) *Attorney, Agent, or Firm* — Sterne, Kessler, Goldstein & Fox P.L.L.C.

(57) ABSTRACT

A power supply that includes positive and negative floating power supply rails. Laterally diffused metal oxide semiconductors (LDMOS) regulate the output voltage of the positive and negative floating power supply rails. In particular, an LDMOS can be configured as a common gate amplifier at the output of the power supply to sense the output of the positive and negative floating power supply rails.

22 Claims, 6 Drawing Sheets

POWER SUPPLY REGULATOR

CROSS REFERENCE TO RELATED APPLICATIONS

This patent application claims the benefit of U.S. Provisional Patent Application No. 61/841,000, filed Jun. 28, 2013, entitled "Power Supply Regulator," which is incorporated herein by reference in its entirety.

FIELD

This application relates generally to power supply regulation, and more particularly to the regulation of one or more internal floating power supply rails.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 3:
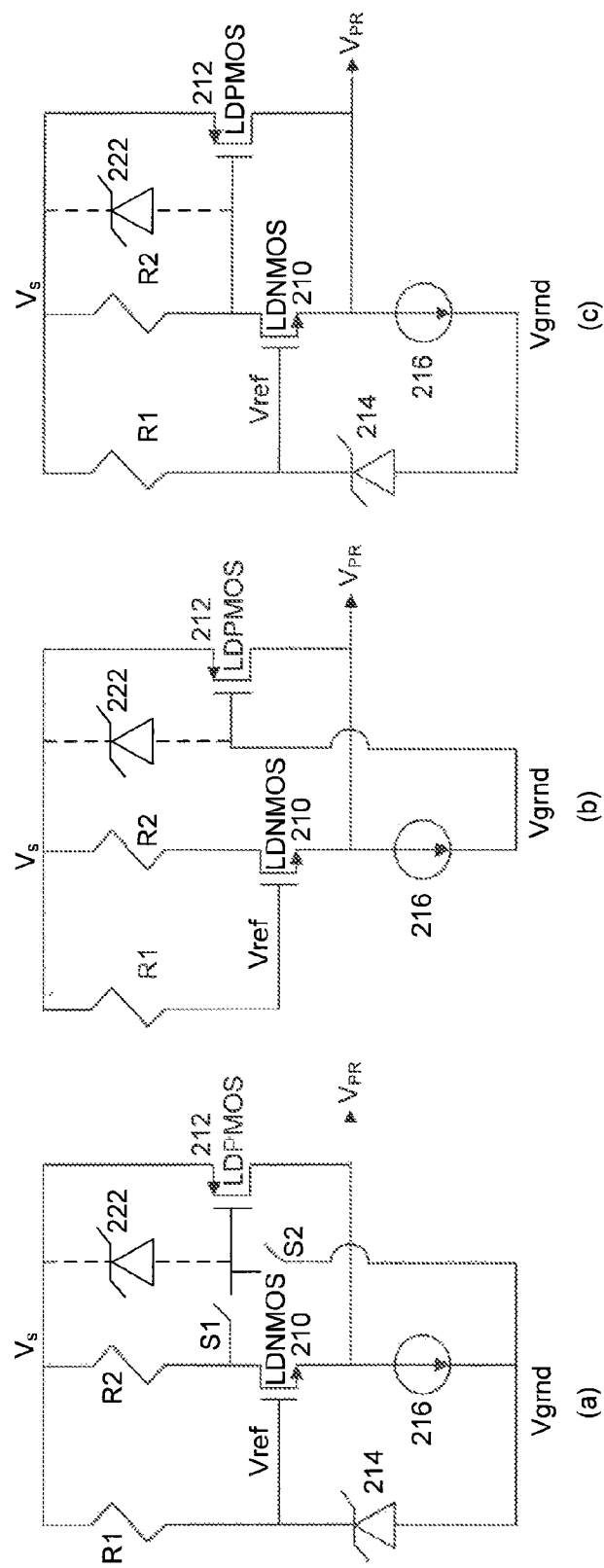

FIGS. 3(a)-(c) illustrate a positive rail voltage generation module in accordance with an exemplary embodiment of the present disclosure.

Figure 4:
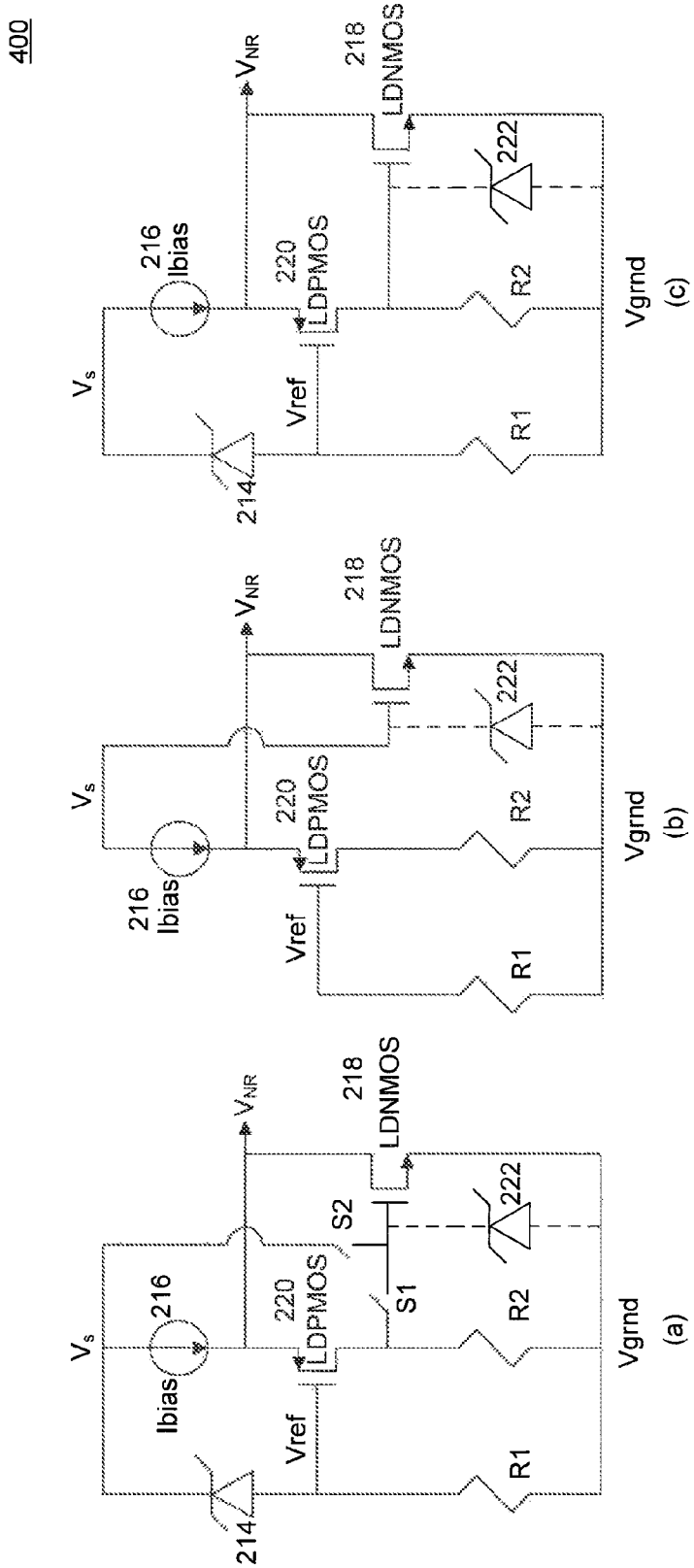

FIG. 4(a)-(c) illustrate a negative rail voltage generation module in accordance with an exemplary embodiment of the present disclosure.

Figure 5:
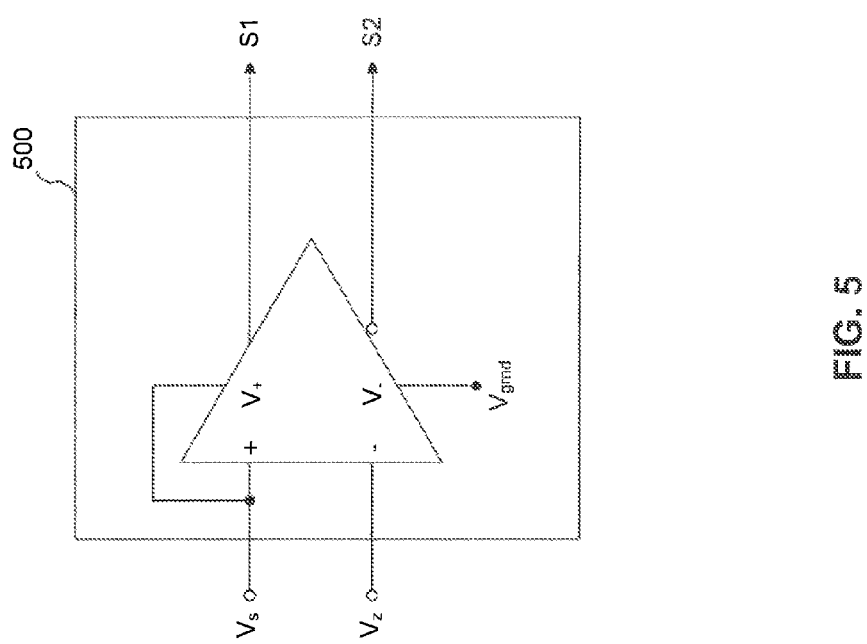

FIG. 5 illustrates a block diagram of a voltage comparison unit in accordance with an exemplary embodiment of the present disclosure.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In conventional power management systems, power management is performed utilizing a voltage regulator module that includes one or more voltage regulators that are configured to provide a regulated output voltage to one or more components of the system, and a control circuit that is configured to monitor and adjust the regulated output voltage.

The power management system can utilize one or more well-known switching regulators to provide the regulated output voltage front a varying input voltage. For example, switching regulators can be implemented in charging devices to regulate the output voltage used to charge a battery of a battery-powered electronic device. Similarly, switching regulators can be implemented in battery-powered electronic devices to regulate the battery output voltage which, when charged or discharged, can be greater than, less than, or substantially the same as a desired output voltage.

Conventional switching regulators generally have one or more power switches (e.g., field effect transistors (FET)) and an inductor-capacitor (LC) filter coupled between the unregulated input and the regulated output. In operation, the control circuit selects the switching regulator configuration (i.e., the operating mode) by controlling respective states (i.e. open or closed) of the power switches and the duration of time during which switch positions remain unchanged.

Depending on the switch configurations, the switching regulator can operate as, for example, a buck converter, a boost converter, or a buck-boost converter. A buck converter down-converts an input voltage to a lower output voltage. The power switches operating in a buck converter configuration alternately connect the input voltage to and disconnect the input voltage from the input of the LC filter. A boost converter, on the other hand, up-converts an input voltage to a higher output voltage. In the boost converter configuration, the input voltage is continuously connected to the input of the LC filter, but the inductor of the LC filter is alternately connected to and disconnected from the load where the regulated output voltage is applied. A buck-boost converter switches between the buck-converter configuration and the boost converter configuration.

Figure 1:
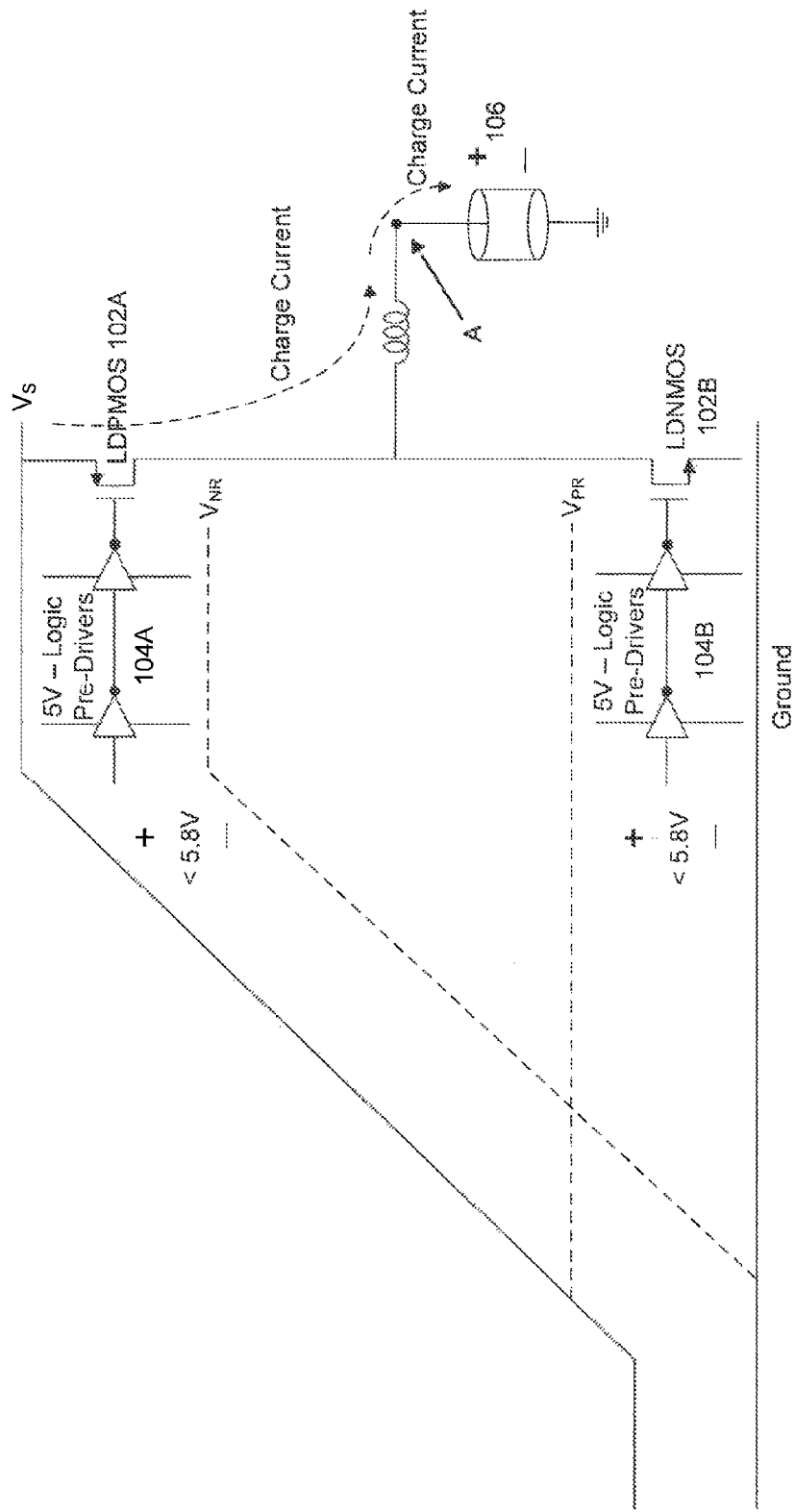
FIG. 1 illustrates a power supply regulator in accordance with an exemplary embodiment of the present disclosure.

FIG. 1 illustrates a power supply regulator 100 in accordance with an exemplary embodiment of the present disclosure. The regulator 100 includes transistors 102A and 102B having respective control circuits 104A and 104B, and an inductor L, all coupled between the unregulated supply voltage $V_s$ and a regulated output voltage (at node A) that charges, for example, battery 106. The control circuits 104 include suitable logic, circuitry, and/or code that is configured to control the switching regulator configuration (i.e., the operating mode of the power supply regulator 100) by controlling the activation of the transistors 102 and the duration of time each transistor 102 is activated. The control circuits 104 are further configured to control the regulated output voltage of the regulator 100 by controlling the duty cycle of the transistors 102. Further, the transistors 102 can be any well-known transistor, including, for example, metal-oxide-semiconductor field-effect transistors (MOSFETs), laterally-diffused (LD) MOSFETs, or the like as will be apparent to those skilled in the relevant art(s).

In an exemplary embodiment, and as discussed in more detail below with reference to FIGS. 2A and 2B, the power supply regulator 100 includes one or more rail voltage generation modules 200 that include suitable logic, circuitry, and/or code that is configured to generate a floating rail voltage based on the supply voltage of the power supply regulator 100 or ground. The floating rail voltages serve as internal bias voltages for the control circuits 104 used to drive the transistors 102 of the power supply regulator 100. The floating rail voltages are derived from a supply voltage $V_S$ that can be received from an external charger adapter, for example. The supply voltage $V_S$ can vary widely during an initial charge, for example, 3.5 to 20 volts as illustrated by the ramping voltage of the supply voltage $V_S$ in FIG. 1.

In an exemplary embodiment, the power supply regulator 100 includes a positive rail voltage generation module 200A and a negative rail voltage generation module 200B configured to generate positive rail voltage $V_{PR}$ and negative rail voltage $V_{NR}$, respectively, where $V_{PR}$ is a voltage that is stepped up from ground and $V_{NR}$ is a voltage stepped down from the supply voltage ($V_s$) of the power supply regulator 100. That is, $V_{PR}=V_{ground}+V_{up}$, where $V_{up}$ is the stepped-up voltage, and $V_{NR}=V_s-V_{down}$, where $V_{down}$ is the stepped-down voltage. It should be appreciated that $V_{up}$ and $V_{down}$ can be equal to, or different from, one another.

In an exemplary embodiment, $V_{up}$ and $V_{down}$ are approximately equal to 5.8 volts and the control circuits 104 (e.g., logic pre-drivers) are configured to operate off of a voltage difference of approximately 5 volts. As discussed above, the supply voltage $V_S$ can be, for example, 3.5 to 20 volts as illustrated by the ramping voltage of the supply voltage $V_S$ in FIG. 1.

(a) Positive Rail Voltage Generation Module

Figure 2A:
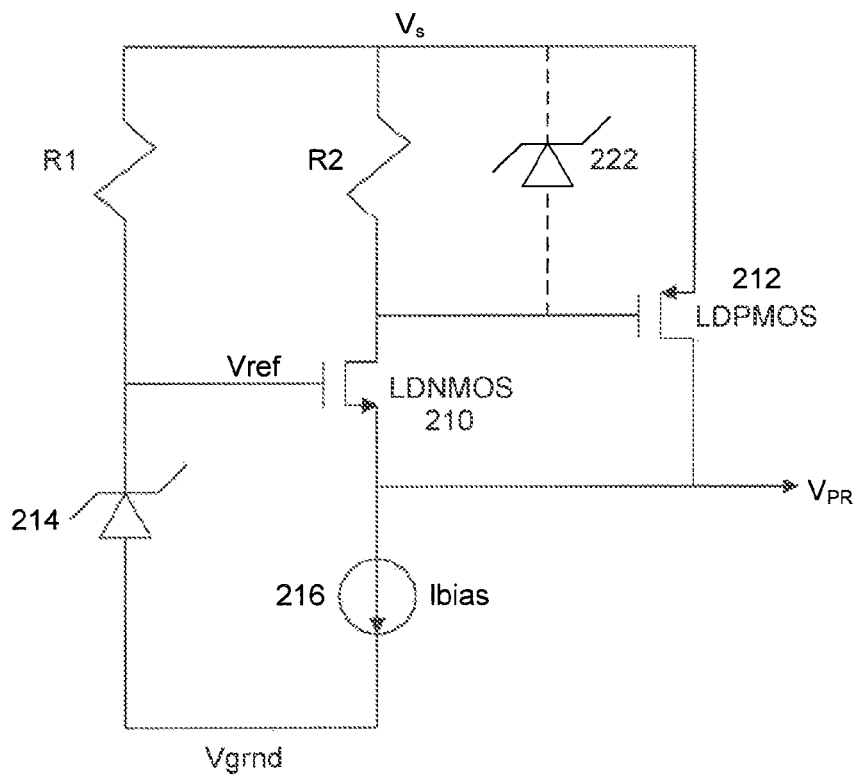
FIG. 2A illustrates a positive rail voltage generation module in accordance with an exemplary embodiment of the present disclosure.

FIG. 2A illustrates a positive rail voltage generation module 200A in accordance with an exemplary embodiment of the present disclosure, and that may be implemented within the power supply regulator 100 of FIG. 1. The positive rail voltage generation module 200A includes suitable logic, circuitry, and/or code that is configured to generate positive rail voltage $V_{PR}$.

In an exemplary embodiment, the positive rail voltage generation module 200A includes n-type laterally-diffused (LD) MOSFET (hereinafter "LDNMOS") 210, p-type laterally-diffused (LD) MOSFET (hereinafter "LDPMOS") 212, zener diode 214, current source 216 and resistors R1 and R2.

The LDNMOS 210 and LDPMOS 212 can be any well-known laterally-diffused metal oxide semiconductor field-effect transistors as will be apparent to those skilled in the relative art. For example, as discussed in more detail below, the LDNMOS 212 and LDPMOS 214 can be 24V laterally-diffused MOSFETs. Further, other transistors can be used as will be understood by those skilled in the arts.

The zener diode 214 can be any well-known zener diode as will be apparent to those skilled in the relative art. For example, as discussed in more detail below, the zener diode 214 is a zener diode having a zener breakdown voltage ($V_Z$) of 5.8 volts.

The current source 216 can be any well-known current source that is configured to absorb and/or deliver an electric current that is independent of the voltage across the current source. Further, the current source 216 can be an independent current source or a dependent current source that delivers (and/or absorbs) a current that is proportional to one or more other voltages and/or currents within the positive rail voltage generation module 200A.

In an exemplary embodiment, the positive rail voltage generation module 200A is formed such that: resistors R1 and R2 are connected in parallel between a voltage source $V_S$ and the gate of the LDNMOS 210 and the drain of the LDNMOS 210, respectively; the drain of the LDNMOS 210 is electrically connected to the gate of the LDPMOS 212; the source and drain of the LDPMOS 212 are electrically connected to the voltage source $V_S$ and the output of the positive rail voltage generation module 200A, respectively; the source of the LDNMOS 210 is electrically connected to the output of the positive rail voltage generation module 200A (i.e., the source of the LDNMOS 210 is electrically connected to the drain of the LDPMOS 212); the current source 216 is electrically connected between the source of the LDNMOS 210 and ground; and the cathode of the zener diode 214 is connected to the gate of the LDNMOS 210 and the anode of the zener diode 214 is connected to ground.

In an exemplary embodiment, the positive rail voltage generation module 200A also includes a second zener diode 222 electrically connected between the voltage source $V_S$ and the gate of the LDPMOS 212. In particular, the cathode of the zener diode 222 is electrically connected to the voltage source $V_S$ and the anode of the zener diode 222 is electrically connected to the gate of the LDPMOS 212. The second zener diode 222 can be optionally included in the positive rail voltage generation module 200A to provide additional voltage protection for the laterally-diffused MOSFETs 210 and 212.

In an exemplary embodiment, the LDNMOS 212 and LDPMOS 214 are, for example, 24V laterally-diffused MOSFETs, the zener diode 214 has a zener breakdown voltage ($V_Z$) of, for example, 5.8 volts, and the resistors R1 and R2 are configured to have resistance values as will be apparent to those skilled in the relevant art(s). For example, the resistance values can be selected such that the components of the positive rail voltage generation module 200A are protected against damaging current levels. It should be appreciated that the specifications of the laterally-diffused MOSFETs 210 and 212, zener diode 214, and resistors R1 and R2 are not limited to the exemplary values discussed herein, and the components can be modified as will be apparent to those skilled in the relevant art(s). For example, the various components can be modified to account for variances in the source voltage provided to the positive rail voltage generation module 200A and/or the desired positive rail voltage $V_{PR}$.

(b) Positive Rail Voltage Generation Module Operation

In operation, the voltage (i.e., $V_{ref}$) at the gate of the LDNMOS 210 is clamped by the zener diode 214. For example, when the voltage source $V_S$ is less than the zener breakdown voltage $V_Z$ of the zener diode 214, the voltage $V_{ref}$ at the gate of the LDNMOS 210 is substantially equal to the voltage source $V_S$. Conversely, when the voltage source $V_S$ is greater than or equal to the zener breakdown voltage $V_Z$ of the zener diode 214, the voltage $V_{ref}$ at the gate of the LDNMOS 210 is substantially equal to the zener breakdown voltage $V_Z$ of the zener diode 214.

With continued reference to FIG. 2A, LDPMOS 212 is configured to regulate the voltage source $V_S$ and to output the positive rail voltage $V_{PR}$. Further, LDNMOS 210 is configured to monitor the positive rail voltage $V_{PR}$ output by the LDPMOS 212 and to control the regulation of the voltage source $V_S$ by LDPMOS 212 based on the monitored positive rail voltage $V_{PR}$. The monitoring and adjusting of the positive rail voltage $V_{PR}$ is performed based on the voltage difference between the gate and source of the LDNMOS 210. In particular, because the zener diode 214 clamps the voltage at the gate of the LDNMOS 210, changes in the source voltage of the LDNMOS 210 affects the conductive properties of the LDNMOS 210.

For example, if the positive rail voltage $V_{PR}$ decreases, the voltage difference between the gate and source of the LDNMOS 210 increases. The increase in the gate-to-source voltage difference of the LDNMOS 210 increases the conductivity of LDNMOS 210 (e.g., turns on the transistor more), which causes more current to flow through resistor R2. Due to the increased current flow, the voltage drop across resistor R2 increases. The increased voltage drop across the resistor R2 causes the voltage at the gate of the LDPMOS 212 to decrease. The decrease in the gate voltage of the LDPMOS 212 causes an increase in conductivity of the LDPMOS 212 (e.g., turns on the transistor more). As the conductivity of the LDPMOS 212 increases, more current flows through the LDPMOS 212 to the output of the positive rail voltage generation module 200A, which increases the positive rail voltage $V_{PR}$ at the output. Stated another way, as the conductivity of the LDPMOS 212 increases, less voltage is dropped across LDNMOS 210 so that $V_{PR}$ rises closer toward $V_S$.

Conversely, if the positive rail voltage $V_{PR}$ increases, the voltage difference between the gate and source of the LDNMOS 210 decreases. The decrease in the gate-to-source voltage difference of the LDNMOS 210 decreases the conductivity of LDNMOS 210, which causes less current to flow through resistor R2. Due to the decreased current flow, the voltage drop across resistor R2 decreases. The decreased voltage drop across the resistor R2 causes the voltage at the gate of the LDPMOS 212 to increase. The increase in the gate voltage of the LDPMOS 212 causes a decrease in conductivity of the LDPMOS 212. As the conductivity of the LDPMOS 212 decreases, less current flows through the LDPMOS 212 to the output of the positive rail voltage generation module 200A, which decreases the positive rail voltage $V_{PR}$ at the output. Stated another way, as the conductivity of the LDPMOS 212 decreases, more voltage is dropped across LDNMOS 210 so that $V_{PR}$ drops relative to $V_S$.

As discussed above, the voltage (i.e., $V_{ref}$) at the gate of the LDNMOS 210 is clamped by the zener diode 214. When the voltage source $V_S$ is less than the zener breakdown voltage $V_Z$ of the zener diode 214, the voltage $V_{ref}$ at the gate of the LDNMOS 210 is substantially equal to the voltage source $V_S$, because substantially no current flows into the gate of the LDNMOS 210 or through the non-conducting zener diode 314. In this case, the positive rail voltage $V_{PR}$ at the output will be the difference between the voltage source $V_S$ and the gate-to-source voltage drop across the LDNMOS 210 (i.e. $V_{GS\_LDNMOS}$). That is, the positive rail voltage satisfies the following equation:

$$V_{PR}=V_S-V_{GS\_LDNMOS}$$

The gate-to-source voltage drop across the LDNMOS 210 ($V_{GS\_LDNMOS}$) can be any well-known gate-to-source voltage drop found in any well-known laterally-diffused MOSFET as will be apparent to those skilled in the relevant art(s). For example, the gate-to-source voltage ($V_{GS\_LDNMOS}$) can be approximately 0.7 volts.

Conversely, when the voltage source $V_S$ is greater than or equal to the zener breakdown voltage $V_Z$ of the zener diode 214, the voltage $V_{ref}$ at the gate of the LDNMOS 210 is substantially equal to the zener breakdown voltage $V_Z$ of the zener diode 214. In this case, the positive rail voltage $V_{PR}$ at the output will be the difference between the zener breakdown voltage $V_Z$ and the gate-to-source voltage drop across the LDNMOS 210 (i.e., $V_{GS\_LDNMOS}$). That is, the positive rail voltage satisfies the following equation:

$$V_{PR}=V_Z-V_{GS\_LDNMOS}$$

(c) Negative Voltage Generation Module

Figure 2B:
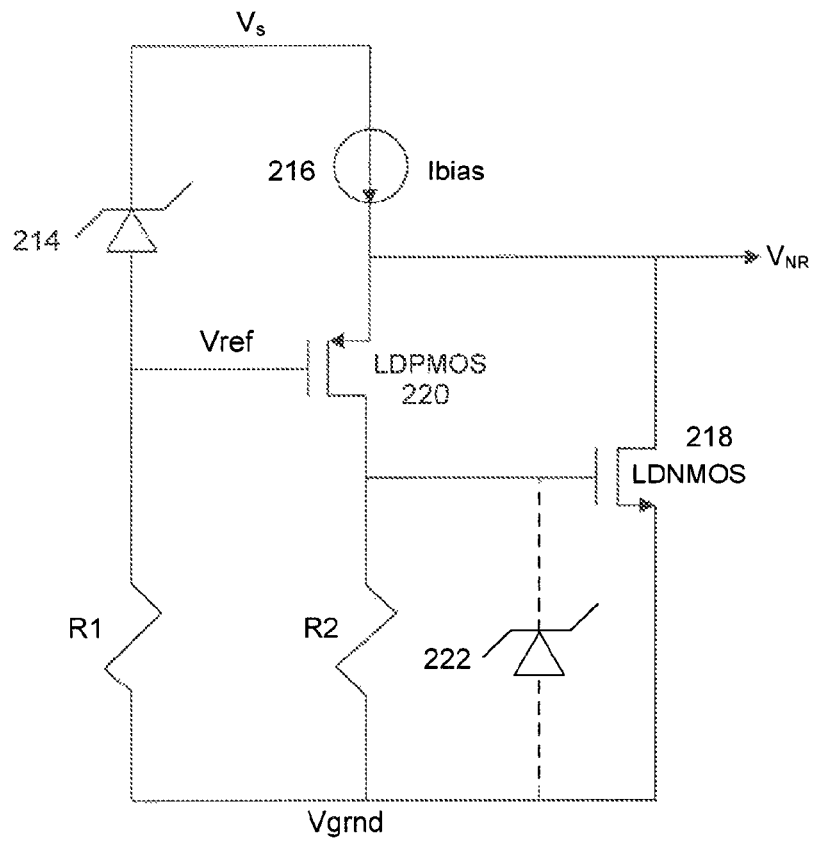
FIG. 2B illustrates a negative rail voltage generation module in accordance with an exemplary embodiment of the present disclosure.

FIG. 2B illustrates a Negative rail voltage generation module 200B in accordance with an exemplary embodiment of the present disclosure, and that may be implemented within the power supply regulator 100 of FIG. 1. The negative rail voltage generation module 200B includes suitable logic, circuitry, and/or code that is configured to generate negative rail voltage $V_{NR}$.

In an exemplary embodiment, the negative rail voltage generation module 200B includes p-type laterally-diffused (LD) MOSFET (hereinafter "LDPMOS") 220, n-type laterally-diffused (LD) MOSFET (hereinafter "LDNMOS") 218, zener diode 214, current source 216 and resistors R1 and R2.

The LDPMOS 220 and LDNMOS 218 can be any well-known laterally-diffused metal-oxide-semiconductor field-effect transistors as will be apparent to those skilled in the relative art. For example, as discussed in more detail below, LDPMOS 220 and LDNMOS 218 can be 24V laterally-diffused MOSFETs. Further, other transistors can be used as will be understood by those skilled in the arts.

The zener diode 214 can be any well-known zener diode as will be apparent to those skilled in the relative art. For example, as discussed in more detail below, the zener diode 214 is a zener diode having a zener breakdown voltage ($V_Z$) of 5.8 volts.

The current source 216 can be any well-known current source that is configured to absorb and/or deliver an electric current that is independent of the voltage across the current source. Further, the current source 216 can be an independent current source or a dependent current source that delivers (and/or absorbs) a current that is proportional to one or more other voltages and/or currents within the positive rail voltage generation module 200B.

In an exemplary embodiment, the negative rail voltage generation module 200B is formed such that; resistors R1 and R2 are connected in parallel between a ground (e.g., $V_{grnd}$) and the gate and drain of the LDPMOS 220, respectively; the drain of the LDPMOS 220 is electrically connected to the gate of the LDNMOS 218; the source and drain of the LDNMOS 218 are electrically connected to ground and the output of the negative rail voltage generation module 200B, respectively; the source of the LDPMOS 220 is electrically connected to the output of the negative rail voltage generation module 200B (i.e., the source of the LDPMOS 220 is electrically connected to the drain of the LDNMOS 218); the current source 216 is electrically connected between the source of the LDPMOS 220 and the voltage source $V_S$; and the cathode of the zener diode 214 is connected to the voltage source $V_S$ and the anode of the zener diode 214 is connected the gate of the LDPMOS 220.

In an exemplary embodiment, the negative rail voltage generation module 200B also includes a second zener diode 222 electrically connected between the gate of the LDNMOS 218 and ground. In particular, the cathode of the zener diode 222 is electrically connected to the gate of the LDNMOS 218 and the anode of the zener diode 222 is electrically connected to ground. The second zener diode 222 can be optionally included in the negative rail voltage generation module 200B to provide additional voltage protection for the laterally-diffused MOSFETs 218 and 220.

In an exemplary embodiment, the LDNMOS 218 and LDPMOS 220 are, for example, 24V laterally-diffused MOSFETs, the zener diode 214 has a zener breakdown voltage ($V_Z$) of, for example, 5.8 volts, and the resistors R1 and R2 are configured to have resistance values as will be apparent to those skilled in the relevant art(s). For example, the resistance values can be selected such that the components of the negative rail voltage generation module 200B are protected against damaging current levels. It should be appreciated that the specifications of the laterally-diffused MOSFETs 218 and 220, zener diode 214, and resistors R1 and R2 are not limited to the exemplary values discussed herein, and the components can be modified as will be apparent to those skilled in the relevant art(s). For example, the various components can be modified to account for variances in the source voltage provided to the negative rail voltage generation module 200B and/or the desired negative rail voltage $V_{NR}$.

(d) Negative Rail Voltage Generation Module Operation

In operation, the voltage (i.e., $V_{ref}$) at the gate of the LDPMOS 220 is based on a relationship between the voltage source $V_S$ and the zener breakdown voltage $V_Z$ of the zener diode 214. For example, when the voltage source $V_S$ is less than the zener breakdown voltage $V_Z$ of the zener diode 214, the voltage $V_{ref}$ at the gate of the LDPMOS 220 is substantially equal to zero. That is, the zener diode 214 functions as an open circuit, and therefore $V_{grnd}$ is applied to the of LDPMOS 220. Conversely, when the voltage source $V_S$ is greater or equal to the zener breakdown voltage $V_Z$ of the zener diode 214, the voltage $V_{ref}$ at the gate of the LDPMOS 220 is substantially equal to the difference between the voltage source $V_S$ and the zener breakdown voltage $V_Z$ of the zener diode 214 (i.e., $V_{ref}=V_S-V_Z$).

With continued reference to FIG. 2, LDNMOS 218 is configured to regulate the voltage source $V_S$ and to output the negative rail voltage $V_{NR}$. Further, LDPMOS 220 is configured to monitor the negative rail voltage $V_{NR}$ output by the LDNMOS 218 and to control the regulation of the voltage source $V_S$ by LDNMOS 218 based on the monitored negative rail voltage $V_{NR}$. The monitoring and adjusting of the negative rail voltage $V_{NR}$ is performed based on the voltage difference between the gate and source of the LDPMOS 220. In particular, because the voltage $V_{ref}$ at the gate of the LDPMOS 220 is kept at a constant voltage with respect to the voltage source $V_S$, changes in the source voltage of the LDPMOS 220 affects the conductive properties of the LDPMOS 220.

For example, if the negative rail voltage $V_{NR}$ increases, the voltage difference between the gate and source of the LDPMOS 220 increases. The increase in the gate-to-source voltage difference of the LDPMOS 220 increases the conductivity of LDPMOS 220 (e.g., turns on the transistor more), which causes more current to flow through resistor R2. Due to the increased current flow, the voltage drop across resistor R2 increases. The increased voltage drop across the resistor R2 causes the voltage at the gate of the LDNMOS 218 to increase. The increase in the gate voltage of the LDNMOS 218 causes an increase in conductivity of the LDNMOS 218 (e.g., turns on the transistor more). As the conductivity of the LDNMOS 218 increases, more current flows through the LDNMOS 218 from the output of the negative rail voltage generation module 200B to ground, which decreases the negative rail voltage $V_{NR}$ at the output. Stated another way, as the conductivity of the LDPMOS 218 increases, less voltage is dropped across LDNMOS 218 so that $V_{NR}$ falls closer toward $V_{grnd}$.

Conversely, if the negative rail voltage $V_{NR}$ decreases, the voltage difference between the gate and source of the LDPMOS 220 decreases. The decrease in the gate-to-source voltage difference of the LDPMOS 220 decreases the conductivity of LDPMOS 220, which causes less current to flow through resistor R2. Due to the decreased current flow, the voltage drop across the resistor R2 decreases. The decreased voltage drop across the resistor R2 causes the voltage at the gate of the LDNMOS 218 to decrease. The decrease in the gate voltage of the LDNMOS 218 causes a decrease in conductivity of the LDNMOS 218. As the conductivity of the LDNMOS 218 decreases, less current flows though the LDNMOS 218 from the output of the negative rail voltage generation module 200B to ground, which increases the negative rail voltage $V_{NR}$ at the output. Stated another way, as the conductivity of the LDPMOS 218 decreases, more voltage is dropped across LDNMOS 218 so that $V_{NR}$ moves away from $V_{grnd}$.

As discussed above, the voltage (i.e., $V_{ref}$) at the gate of the LDPMOS 220 is based on a relationship between the voltage source $V_S$ and the zener breakdown voltage $V_Z$ of the zener diode 214. When the voltage source $V_S$ is less than the zener breakdown voltage $V_Z$ of the zener diode 214, the voltage $V_{ref}$ at the gate of the LDPMOS 220 is substantially equal to zero. In this case, the negative rail voltage $V_{NR}$ at the output will be the sum of the voltage $V_{ref}$ at the gate of the LDPMOS 220 and the gate-to-source voltage drop across the LDPMOS 220 (i.e., $V_{GS\_LDPMOS}$). Because the voltage $V_{ref}$ at the gate of the LDPMOS 220 is substantially equal to zero, the negative rail voltage $V_{NR}$ satisfies the following equation:

$$V_{NR}=V_{GS\_LDPMOS}$$

The gate-to-source voltage drop across the LDPMOS 220 ($V_{GS\_LDPMOS}$) can be any well-known gate-to-source voltage drop found in any well-known laterally-diffused MOSFET as will be apparent to those skilled in the relevant art(s). For example, the gate-to-source voltage ($V_{GS\_LDPMOS}$) can be approximately 0.7 volts. Therefore, when the voltage source $V_S$ is less than the zener breakdown voltage $V_Z$ of the zener diode 214, the negative rail voltage $V_{NR}$ is equal to the gate-to-source voltage ($V_{GS\_LDPMOS}$).

Conversely, when the voltage source $V_S$ is greater than or equal to the zener breakdown voltage $V_Z$ of the zener diode 214, the voltage $V_{ref}$ at the gate of the LDPMOS 220 is substantially equal to the difference between the voltage source $V_S$ and the zener breakdown voltage $V_Z$ of the zener diode 214 (i.e., $V_{ref}=V_S-V_Z$). In this case, the negative rail voltage satisfies the following equation:

$$V_{NR}=V_S-V_Z+V_{GS\_LDPMOS}$$

(e) Positive Rail Voltage Generation Module with Voltage Comparison

FIG. 3(a) illustrates a positive rail voltage generation module 300 in accordance with an exemplary embodiment of the present disclosure, and that may be implemented within the power supply regulator 100 of FIG. 1. The positive rail voltage generation module 300 is similar to the positive rail voltage generation module 200A of FIG. 2A, and includes suitable logic, circuitry, and/or code that is configured to generate positive rail voltage $V_{PR}$.

In an exemplary embodiment, the positive rail voltage generation module 300 includes LDNMOS 210, LDPMOS 212, zener diode 214, current source 216 and resistors R1 and R2 similar to the positive rail voltage generation module 200A of FIG. 2A. The discussion of these components has been omitted for brevity.

The positive rail voltage generation module 300 also includes a first switch (S1) electrically connected between the drain of the LDNMOS 210 and the gate of the LDPMOS 212, a second switch (S2) electrically connected between ground and both the drain of the LDNMOS 210 and the gate of the LDPMOS 212, and a voltage comparison unit 500 (see FIG. 5). The switches S1 and S2 can be, for example, any well-known transistor configured to operate based on control signals from the voltage comparison unit 500.

With reference to FIG. 5, the voltage comparison unit 500 includes suitable logic, circuitry, and/or code that is configured to compare the voltage source $V_S$ to the zener breakdown voltage $V_Z$ of the zener diode 214, and to control the operation of the switches S1 and S2 based on the results of the comparison. For example, the voltage comparison unit 500 can include first and second outputs that are connected to switches S1 and S2, respectively, to provide control signals to the switches S1 and S2.

In an exemplary embodiment, the voltage comparison unit 500 includes an operational amplifier configured as a voltage comparator. Here, the voltage source $V_S$ is connected to the non-inverted input of the operational amplifier and a voltage corresponding to the zener breakdown voltage $V_Z$ of the zener diode 214 is connected to inverted input. The operational amplifier output can include an output and an inverted output, where the output is connected to, for example, switch S1 and the inverted output is connected to, for example, switch S2. In operation, the switches S1 and S2 are configured to open and close based on the control signals output from the operational amplifier.

For example, if the voltage source $V_S$ is less than the zener breakdown voltage $V_Z$ of the zener diode 214, the voltage comparison unit 500 is configured to open switch S1 and to close switch S2. The equivalent circuit of this configuration is shown in FIG. 3(b). In particular, by opening switch S1 and closing switch S2, the gate of the LDPMOS 212 is no longer affected by the drain voltage of the LDNMOS 210. Rather, the gate of the LDPMOS 212 is shorted to ground (see FIG. 3(b)). By shorting the gate of the LDPMOS 212 to ground, the positive rail voltage $V_{PR}$ is equal to difference between the source voltage $V_S$ and the drain-to-source voltage of the LDPMOS 212 (i.e., $V_{DS\_LDPMOS}$). In this case, the positive rail voltage satisfies the following equation:

$$V_{PR}=V_S-V_{DS\_LDPMOS}$$

As one of ordinary skill in the related art(s) would understand, MOSFETs generally exhibit drain-to-source voltages that are significantly less than their corresponding gate-to-source voltage (i.e., $V_{DS\_LDPMOS}<V_{GS\_LDPMOS}$). Therefore, in cases where the voltage source $V_S$ is less than the zener breakdown voltage $V_Z$ of the zener diode 214, the positive rail voltage generation module 300 can be configured to generate a larger positive rail voltage $V_{PR}$ than compared to the positive rail voltage $V_{PR}$ generated by the positive rail voltage generation module 200A of FIG. 2A. The larger positive rail voltage $V_{PR}$ will provide for a larger internal voltage range when the overall voltage range is limited by the low voltage source $V_S$.

In cases where the voltage source $V_S$ is greater than or equal to the zener breakdown voltage $V_Z$ of the zener diode 214, the voltage comparison unit 500 is configured to close switch S1 and to open switch S2. The equivalent circuit shown in FIG. 3(c) is similar to the configuration of positive rail voltage generation module 200A of FIG. 2A. In particular, the gate of the LDPMOS 212 is electrically connected to the drain of the LDNMOS 210. In this configuration, the positive rail voltage satisfies the following equation:

$$V_{PR}=V_Z-V_{GS\_LDNMOS}$$

Here, the voltage drop across the gate-to-source of the LDNMOS 210 has less of an impact on the internal voltage range due to the larger overall voltage range provided by the voltage source $V_S$.

In an exemplary embodiment, the positive rail voltage generation module 300 also includes a second zener diode 222 electrically connected between the voltage source $V_S$ and the gate of the LDPMOS 212 similar to the embodiment discussed above with respect to the positive rail voltage generation module 200A of FIG. 2A.

(f) Negative Rail Voltage Generation Module with Voltage Comparison

FIG. 4(a) illustrates a negative rail voltage generation module 400 in accordance with an exemplary embodiment of the present disclosure, and that may be implemented within the power supply regulator 100 of FIG. 1. The negative rail voltage generation module 400 is similar to the negative rail voltage generation module 200B of FIG. 2B, and includes suitable logic, circuitry, and/or code that is configured to generate negative rail voltage $V_{NR}$.

In an exemplary embodiment, the negative rail voltage generation module 400 includes LDNMOS 218, LDPMOS 220, zener diode 214, current source 216 and resistors R1 and R2 similar to the negative rail voltage generation module 200B of FIG. 2B. The discussion of these components has been omitted for brevity.

The negative rail voltage generation module 400 also includes a first switch (S1) electrically connected between the drain of the LDPMOS 220 and the gate of the LDNMOS 218, a second switch (S2) electrically connected between ground and both the drain of the LDPMOS 220 and the gate of the LDNMOS 218, and voltage comparison unit 500. In alternative exemplary embodiment, the negative rail voltage generation module 400 and the positive rail voltage generation module 300 can each include a respective voltage comparison unit 500 rather than be configured to share a single voltage comparison unit 500.

As discussed above, the voltage comparison unit 500 includes suitable logic, circuitry, and/or code that is configured to compare the voltage source $V_S$ to the zener breakdown voltage $V_S$ of the zener diode 214, and to control the operation of the switches S1 and S2 based on the results of the comparison.

For example, if the voltage source $V_S$ is less than the zener breakdown voltage $V_Z$ of the zener diode 214, the voltage comparison unit 500 is configured to open switch S1 and to close switch S2. The equivalent circuit of this configuration is shown in FIG. 4(b). In particular, by opening switch S1 and closing switch S2, the gate of the LDNMOS 218 is no longer affected by the drain voltage of the LDPMOS 220. Rather, the gate of the LDNMOS 218 is shorted to the voltage source $V_S$ (see FIG. 4(b)). By shorting the gate of the LDNMOS 218 to the voltage source $V_S$, the negative rail voltage $V_{NR}$ is equal to the drain-to-source voltage of the LDNMOS 218 (i.e., $V_{DS\_LDNMOS}$), as the source of LDNMOS 218 is ground. In this case, the negative rail voltage satisfies the following equation:

$$V_{NR}=V_{DS\_LDNMOS}$$

Again, as one of ordinary skill in the related art(s) would understand, MOSFETs generally exhibit drain-to-source voltages that are significantly less than their corresponding gate-to-source voltage (i.e., $V_{DS\_LDNMOS}<V_{GS\_LDNMOS}$). Therefore, in cases where the voltage source $V_S$ is less than the zener breakdown voltage $V_Z$ of the zener diode 214, the negative rail voltage generation module 400 can be configured to generate a smaller negative rail voltage $V_{NR}$ than compared to the negative rail voltage $V_{NR}$ generated by the negative rail voltage generation module 200B of FIG. 2B. The smaller negative rail voltage $V_{NR}$ will provide for a larger internal voltage range when the overall voltage range is limited by the low voltage source $V_S$.

In cases where the voltage source $V_S$ is greater than or equal to the zener breakdown voltage $V_Z$ of the zener diode 214, the voltage comparison unit 500 is configured to close switch S1 and to open switch S2. The equivalent circuit shown in FIG. 4(c) is similar to the configuration of negative rail voltage generation module 200B of FIG. 2B. In particular, the gate of the LDNMOS 218 is electrically connected to the drain of the LDPMOS 220. In this configuration, the negative rail voltage satisfies the following equation:

$$V_{NR} = V_S - V_Z + V_{GS\_LDPMOS}$$

Here, the voltage drop across the gate-to-source of the LDPMOS 220 has less of an impact on the internal voltage range due to the larger overall voltage range provided by the voltage source $V_S$.

In an exemplary embodiment, and similar to the positive rail voltage generation module 300, the negative rail voltage generation module 400 can also include a second zener diode 222 electrically connected between the gate of LDNMOS 218 and around similar to the embodiment discussed above with respect to the negative rail voltage generation module 200B of FIG. 2B.

(g) Example Operation of a Power Supply Regulator

As illustrated in FIG. 1, and with reference to FIGS. 2A-4(c), the power supply regulator 100 can include floating positive rail voltage $V_{PR}$ and floating negative rail voltage $V_{NR}$ that provide internal bias voltages for the control circuits 104 that are used to drive the transistors 102 of the power supply regulator 100. As with all transistors, these control circuits have voltage limits associated with their internal transistor junctions (e.g., gate-source) to prevent breakdown, which could occur if the supply voltage $V_s$ were used directly without $V_{PR}$ and $V_{NR}$ given the supply voltage's $V_s$ wide variation.

Here, the positive rail voltage $V_{PR}$ and negative rail voltage $V_{NR}$ are referred to as floating rail voltages because they follow/track the supply voltage $V_s$ over at least a portion of the input range for $V_s$. For example, starting from $V_s=0V$, the positive rail voltage $V_{PR}$ substantially tracks the increase in the supply voltage $V_s$ up to a predetermined threshold (e.g., zener breakdown voltage $V_Z$), but will be capped at approximately the predetermined threshold voltage once the supply voltage $V_s$ rises above the predetermined threshold. The negative rail voltage $V_{NR}$ is approximately equal to ground when the supply voltage $V_s$ is less than the predetermined threshold voltage, and is approximately equal to the difference of the supply voltage $V_s$ and the predetermined threshold voltage when the supply voltage $V_s$ is equal to, and increases above, the predetermined threshold voltage. As such, the rail voltages $V_{PR}$ and $V_{NR}$ are derived from the zener breakdown voltages $V_Z$ associated with the positive and negative rail voltage generation modules of FIGS. 2A-4(c) and the difference between the zener breakdown voltages $V_Z$ and the supply voltage $V_s$. These relationships are illustrated in Table 1 shown below with reference to variables discussed above in the corresponding discussion of the exemplary embodiments associated with FIGS. 2A-4(c).

sistor junctions for the control circuit(s) 104A are protected from breakdown since the floating, negative rail voltage $V_{NR}$ substantially tracks any increase in the supply voltage $V_s$ above the predetermined threshold voltage. Likewise, the floating positive rail voltage $V_{PR}$ provides the positive bias voltage for control circuit(s) 104B, and chip ground provides the negative or ground voltage. Even though the floating positive rail voltage $V_{PR}$ is derived from the supply voltage $V_s$, the floating positive rail voltage $V_{PR}$ is capped at the predetermined threshold voltage 5.8 v), thereby limiting voltage drops seen across the transistor junctions of the control circuit(s) 104B.

CONCLUSION

The aforementioned description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the invention is defined only in accordance with the following claims and their equivalents.

Embodiments may be implemented in hardware (e.g., circuits), firmware, software, or any combination thereof.

TABLE 1

| Supply Voltage ($V_S$) | Positive Rail ($V_{PR}$) | Negative Rail ($V_{NR}$) | $V_{PR}$ with voltage comparison | $V_{NR}$ with voltage comparison |
| --- | --- | --- | --- | --- |
| $V_S < V_Z$ | $V_S - V_{GS\_LDNMOS}$ | $V_{GS\_LDPMOS}$ | $V_S - V_{DS\_LDPMOS}$ | $V_{DS\_LDNMOS}$ |
| $V_S \geq V_Z$ | $V_Z - V_{GS\_LDNMOS}$ | $V_S - V_Z + V_{GS\_LDPMOS}$ | $V_Z - V_{GS\_LDNMOS}$ | $V_S - V_Z + V_{GS\_LDPMOS}$ |

Referring back to FIG. 1, the supply voltage $V_s$ provides the positive bias voltage and the floating negative rail voltage $V_{NR}$ provides the ground (or negative bias voltage) for control circuit(s) 104A that drive the LDPMOS 102A. Even though the supply voltage $V_s$ varies widely, the tran- Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A voltage rail generation circuit configured to regulate an input voltage and to generate a regulated voltage, the voltage rail generation circuit comprising:
    a first transistor configured to regulate the input voltage and output the regulated voltage; and
    a second transistor configured to sense the regulated voltage and to control a regulation of the regulated voltage by the first transistor based on the sensed regulated voltage,
    wherein a source of the second transistor is connected to the regulated voltage, and the second transistor is configured to control the regulation of the regulated voltage based on a voltage difference between a gate voltage of the second transistor and the sensed regulated voltage.

2. The voltage rail generation circuit according to claim 1, further comprising a zener diode having a zener breakdown voltage, the zener diode being connected between a gate of the second transistor and ground.

3. The voltage rail generation circuit according to claim 2, wherein the gate voltage of the second transistor is:
    less than or equal to the zener breakdown voltage when the input voltage is greater than or equal to the zener breakdown voltage, or
    equal to the input voltage when the input voltage is less than the zener breakdown voltage.

4. The voltage rail generation circuit according to claim 1, wherein a drain of the second transistor is connected to a gate of the first transistor, and wherein the second transistor is configured to control a gate voltage of the first transistor based on the voltage difference between the gate voltage of the second transistor and the sensed regulated voltage.

5. The voltage rail generation circuit according to claim 4, wherein the second transistor is configured to control the regulation of the regulated voltage at the drain of the first transistor based on the gate voltage the first transistor.

6. The voltage rail generation circuit according to claim 1, wherein the second transistor is configured as a common gate amplifier.

7. A voltage rail generation circuit configured to regulate an input voltage and to generate a regulated voltage, the voltage rail generation circuit comprising:
    a first transistor configured to regulate the input voltage and output the regulated voltage;
    a second transistor configured to sense the regulated voltage and to control a regulation of the regulated voltage by the first transistor based on the sensed regulated voltage;
    a zener diode having a zener breakdown voltage, the zener diode being connected between a gate of the second transistor and ground;
    a first switch configured to selectively connect a drain of the second transistor to a gate of the first transistor;
    a second switch configured to selectively connect the gate of the first transistor to ground; and
    a voltage comparison unit configured to control the selective connections of the first and second switches, wherein the voltage comparison unit is configured to open the first switch and close the second switch when the input voltage is less than or equal to the zener breakdown voltage, and wherein the voltage comparison unit is configured to close the first switch and open the second switch when the input voltage is greater than the zener breakdown voltage.

8. A voltage rail generation circuit configured to regulate an input voltage and to generate a regulated voltage, the voltage rail generation circuit comprising:
    a first transistor configured to regulate the input voltage and output the regulated voltage;
    a second transistor configured to sense the regulated voltage and to control a regulation of the regulated voltage based on the sensed regulated voltage; and
    a zener diode having a zener breakdown voltage, the zener diode configured to clamp a gate of the second transistor to a gate voltage,
    wherein a source of the second transistor is connected to the regulated voltage, and the second transistor is configured to control the regulation of the regulated voltage based on a voltage difference between the gate voltage of the second transistor and the sensed regulated voltage.

9. The voltage rail generation circuit according to claim 8, wherein a drain of the second transistor is connected to a gate of the first transistor, the second transistor is configured to control a gate voltage at the gate of the first transistor based on the voltage difference, and the first transistor is configured to generate the regulated voltage at a drain of the first transistor based on the gate voltage of the first transistor.

10. The voltage rail generation circuit according to claim 8, wherein the gate voltage of the second transistor is less than or equal to the zener breakdown voltage when the input voltage is greater than or equal to the zener breakdown voltage, or is equal to the input voltage when the input voltage is less than the zener breakdown voltage.

11. The voltage rail generation circuit according to claim 1, further comprising a current source connected between the source of the second transistor and ground, and the current source configured to absorb or deliver an electrical current from or to the second transistor.

12. The voltage rail generation circuit according to claim 2, further comprising a second zener diode connected between a voltage source of the input voltage and a gate of the first transistor, the second zener diode configured to provide voltage protection for the first transistor and the second transistor.

13. The voltage rail generation circuit according to claim 7, wherein when the first switch is closed and the second switch is open, the second transistor is configured to control a gate voltage of the first transistor based on a voltage difference between a gate voltage of the second transistor and the sensed regulated voltage.

14. The voltage rail generation circuit according to claim 13, wherein the second transistor is configured to control the regulation of the regulated voltage at a drain of the first transistor based on the gate voltage the first transistor.

15. The voltage rail generation circuit according to claim 7, further comprising a current source connected between a source of the second transistor and ground, and the current source configured to absorb or deliver an electrical current from or to the second transistor.

16. The voltage rail generation circuit according to claim 7, further comprising a second zener diode connected between a voltage source of the input voltage and the gate of the first transistor, the second zener diode configured to provide voltage protection for the first transistor and the second transistor.

17. The voltage rail generation circuit according to claim 8, wherein the second transistor is configured to control a gate voltage of the first transistor based on the voltage difference between the gate voltage of the second transistor and the sensed regulated voltage.

18. The voltage rail generation circuit according to claim 17, wherein the second transistor is configured to control the regulation of the regulated voltage at a drain of the first transistor based on the gate voltage the first transistor.

19. The voltage rail generation circuit according to claim 8, further comprising a current source connected between the source of the second transistor and ground, and the current source configured to absorb or deliver an electrical current from or to the second transistor.

20. The voltage rail generation circuit according to claim 8, further comprising a second zener diode connected between a voltage source of the input voltage and a gate of the first transistor, the second zener diode configured to provide voltage protection for the first transistor and the second transistor.

21. The voltage rail generation circuit according to claim 1, wherein the first transistor is a p-type transistor, and the second transistor is an n-type transistor.

22. The voltage rail generation circuit according to claim 8, wherein the first transistor is a p-type transistor, and the second transistor is an n-type transistor.

* * * * *